United States Patent
Nader et al.

[11] Patent Number: 6,106,030
[45] Date of Patent: Aug. 22, 2000

[54] TUBULAR COUPLING

[75] Inventors: Joseph Nader, Port Sanilac; Fred Georg Schroeder, Grosse Ile, both of Mich.

[73] Assignee: Ford Motor Co., Dearborn, Mich.

[21] Appl. No.: 09/027,938

[22] Filed: Feb. 23, 1998

[51] Int. Cl.⁷ .............................. F16L 17/00; F16J 15/10
[52] U.S. Cl. .......................... 285/368; 285/270; 277/612; 277/648; 277/652
[58] Field of Search .................... 285/370, 371, 285/363, 368, 414; 277/612, 648, 652

[56]  References Cited

U.S. PATENT DOCUMENTS

| | | | |
|---|---|---|---|
| 1,891,424 | 12/1932 | Kirkpatrick | 285/370 X |
| 1,968,516 | 7/1934 | Dieter . | |
| 2,719,768 | 10/1955 | Webber | 277/648 |
| 2,757,942 | 5/1956 | Eberhart . | |
| 2,829,909 | 4/1958 | Magnani . | |
| 2,900,199 | 8/1959 | Logan | 285/370 X |
| 2,914,344 | 11/1959 | Anthes . | |
| 2,939,728 | 6/1960 | Bitel . | |
| 3,339,947 | 9/1967 | Maisey . | |
| 3,372,949 | 3/1968 | McLay | 285/370 X |
| 3,439,944 | 4/1969 | Leutenegger . | |
| 3,458,219 | 7/1969 | Wesch . | |
| 3,700,112 | 10/1972 | Maeshiba . | |
| 3,918,679 | 11/1975 | Silvana . | |
| 3,992,045 | 11/1976 | Whittell, Jr. et al. | 285/371 |
| 4,055,359 | 10/1977 | McWethy . | |
| 4,133,563 | 1/1979 | Yamazaki . | |
| 4,193,616 | 3/1980 | Sarson et al. . | |
| 4,303,103 | 12/1981 | Marks et al. | 285/370 X |
| 4,335,755 | 6/1982 | Sadler et al. | 138/145 |
| 4,362,323 | 12/1982 | Lodder et al. . | |
| 4,376,525 | 3/1983 | Fremy . | |
| 4,401,326 | 8/1983 | Blair . | |
| 4,464,871 | 8/1984 | Schwendimann | 285/371 X |
| 4,519,637 | 5/1985 | Folkers . | |
| 4,550,936 | 11/1985 | Haeber et al. . | |
| 4,573,714 | 3/1986 | Sweeney | 285/370 X |
| 4,606,564 | 8/1986 | Kurachi . | |
| 4,621,841 | 11/1986 | Wakefield . | |
| 4,632,434 | 12/1986 | Proctor et al. . | |
| 4,641,859 | 2/1987 | Walters . | |
| 4,647,082 | 3/1987 | Fournier et al. . | |
| 4,659,119 | 4/1987 | Reimert . | |
| 4,664,421 | 5/1987 | Jones . | |
| 4,715,624 | 12/1987 | Frye . | |
| 4,728,130 | 3/1988 | Corzine . | |
| 4,750,762 | 6/1988 | Corzine . | |
| 4,783,101 | 11/1988 | Peterson et al. . | |
| 4,804,290 | 2/1989 | Balsells . | |
| 4,850,622 | 7/1989 | Suzuki . | |
| 4,872,710 | 10/1989 | Konecny et al. . | |
| 4,906,031 | 3/1990 | Vyse . | |
| 4,913,472 | 4/1990 | Janakirama-Rao | 285/363 X |
| 4,923,228 | 5/1990 | Laipply . | |
| 4,927,189 | 5/1990 | Burkit | 285/370 X |
| 4,991,882 | 2/1991 | Gahwiler . | |
| 5,002,314 | 3/1991 | Smith . | |
| 5,005,877 | 4/1991 | Hayman . | |
| 5,169,161 | 12/1992 | Jones | 277/615 |
| 5,174,615 | 12/1992 | Foster et al. | 285/370 X |
| 5,195,787 | 3/1993 | Bartholomew . | |
| 5,211,427 | 5/1993 | Washizu . | |
| 5,213,342 | 5/1993 | Weber | 277/648 |
| 5,316,352 | 5/1994 | Smith . | |
| 5,364,131 | 11/1994 | Hartsock et al. . | |
| 5,480,196 | 1/1996 | Adams, Jr. | 285/370 X |
| 5,655,571 | 8/1997 | Gawlik | 277/612 |

FOREIGN PATENT DOCUMENTS

| | | | |
|---|---|---|---|
| 91500 | 10/1961 | Denmark . | |
| 69098 | 1/1983 | European Pat. Off. | 285/370 |
| 0 340 194 A1 | 11/1989 | European Pat. Off. . | |

(List continued on next page.)

*Primary Examiner*—Anthony Knight
*Assistant Examiner*—Vishal Patel
*Attorney, Agent, or Firm*—Raymond L. Coppiellie, Esq.

[57]  ABSTRACT

A tubular coupling assembly is disclosed which includes a pair of identical coupling members secured together by a splined stud. A sleeve member is inserted between the identical members to provide a leak free fluid pathway between the coupling members.

13 Claims, 2 Drawing Sheets

FOREIGN PATENT DOCUMENTS

| | | |
|---|---|---|
| 12203752 | 1/1960 | France . |
| 1277984 | 10/1961 | France . |
| 615105C | 6/1935 | Germany . |
| 2056982A | 5/1972 | Germany . |
| 2840962 | 4/1979 | Germany ................................ 285/370 |
| 2905035 | 8/1979 | Germany . |
| 4-29693 | 1/1992 | Japan . |
| 405118484 | 5/1993 | Japan ..................................... 285/370 |
| 7802712 | 9/1979 | Netherlands . |
| 83959 | 7/1954 | Norway .................................. 285/370 |
| 838265 | 6/1981 | U.S.S.R. ................................ 285/370 |
| 399979 | 10/1933 | United Kingdom ................... 411/424 |
| 994294 | 6/1965 | United Kingdom . |
| 1201304 | 8/1970 | United Kingdom . |
| 1320730A | 6/1973 | United Kingdom . |
| 1 494 669 | 12/1977 | United Kingdom . |
| 2 205 137 | 11/1988 | United Kingdom . |
| WO 94/08171 | 4/1994 | WIPO . |

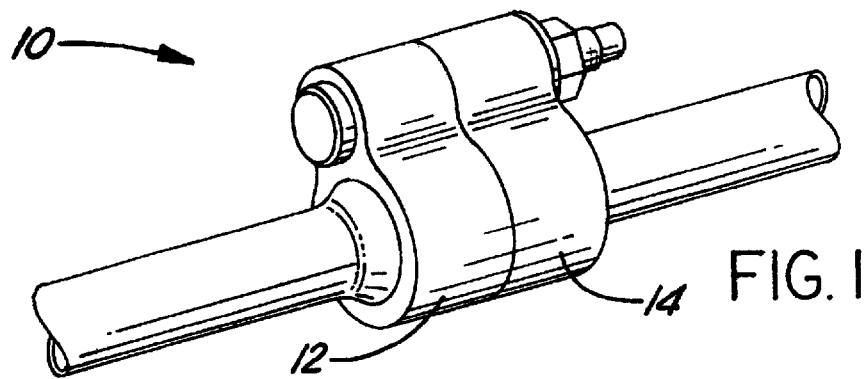
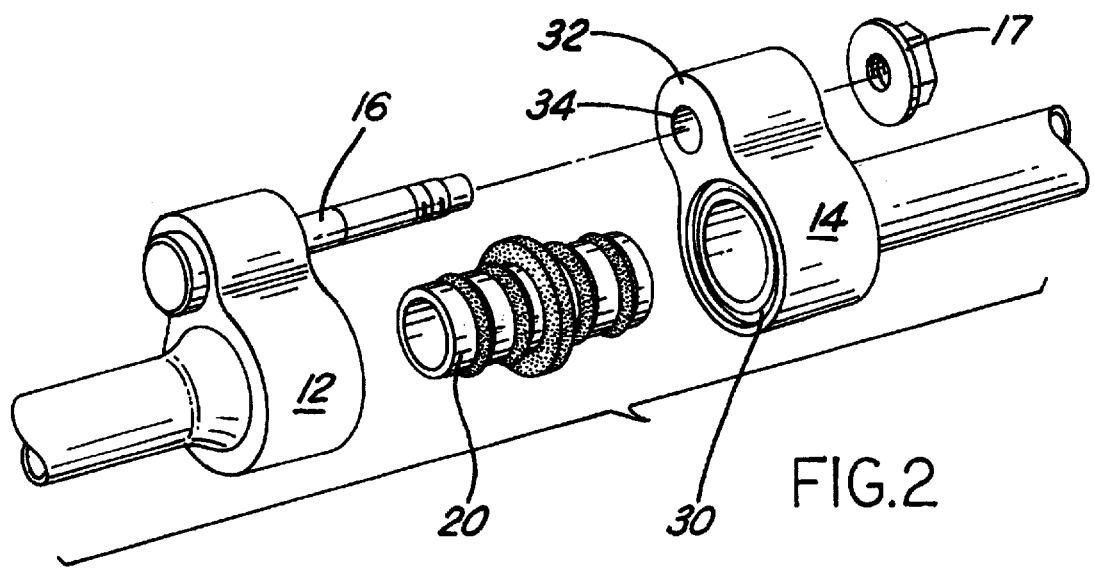
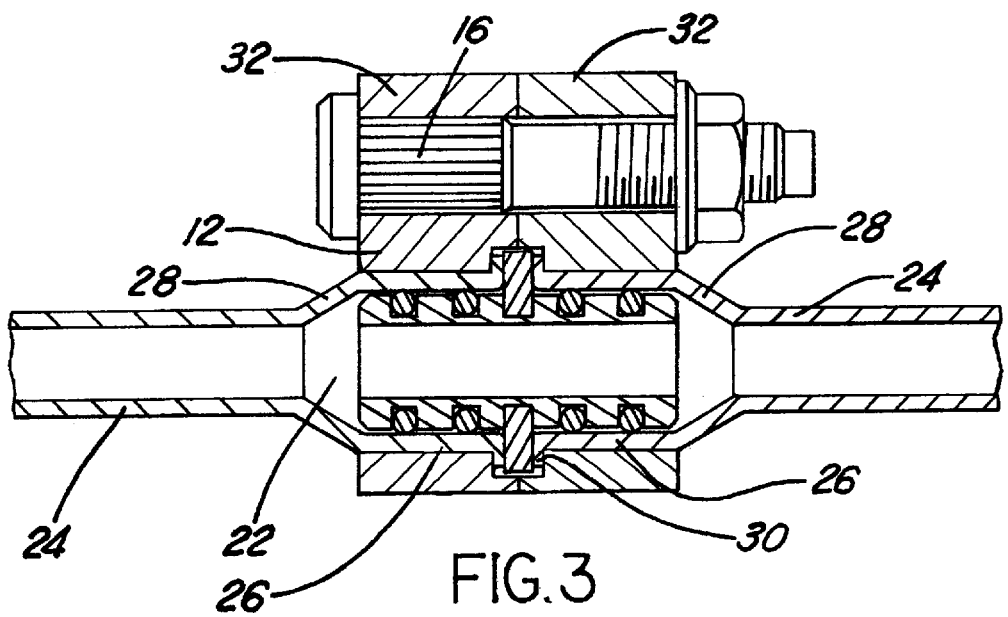

TUBULAR COUPLING

BACKGROUND OF THE INVENTION

1. Field of the Invention

The present invention relates generally to hose fitting assemblies. More particularly, the present invention relates to a tubular coupling designed for use in automotive systems.

2. Disclosure Information

Numerous types of tubular couplings have been described in the prior art. For example, U.S. Pat. Nos. 4,055,359 and 4,401,326, assigned to the assignee of the present invention, disclose a quick-connect tubular coupling which permits a fluid-type connection to be made between two fluid-conducting tubes in a relatively short time. Typically, these couplings join together tubing made from steel, aluminum, or other metal alloys. These types of couplings identified in the above patents are known as spring lock quick connect couplings and rely upon the radial force of a garter spring to keep a male and female pipe member together in a leak free environment.

As with most types of fluid couplings, this assembly includes a male portion and a female portion secured together with some fastening mechanism. Fabrication of the coupling members can be quite complex requiring multiple fabrication steps for each of the male and female members. This complexity increases the cost of the assembly. It would therefore be advantageous to provide a coupling assembly which reduces a complexity and therefore the cost of the coupling assembly.

SUMMARY OF THE INVENTION

It is an object of the present invention to provide a tubular coupling assembly which reduces the manufacturing complexity of the assembly.

The present invention overcomes the disadvantages in the prior art by providing a tubular coupling assembly comprising a pair of identical coupling members configured to be matingly engagable. Each coupling member has a tubular portion, an expanded portion and a transition portion disposed between the tubular and expanded portions. The expanded portion at the end of the tubular portion includes a flange portion circumferentially disposed at one end thereof such that when the expanded portions of two members are in sealing contact with each other a volume is defined therebetween. A stud receiving block member is disposed on the expanded portion of each of the tubular portions and includes an aperture therethrough. The assembly further includes a generally cylindrical, elongate sleeve member disposed within the volume, the sleeve member including a plurality of sealing members circumferentially disposed around an outside surface of the sleeve. The coupling assembly also includes a splined retainer adapted to be press fit into either of the apertures in the stud receiving blocks on the expanded portions of the identical coupling members. The splined retainer extends through the apertures to secure the coupling members together.

It is an advantage of the present invention that manufacturing complexity can be reduced by employing a pair of identical coupling members to form a tubular coupling assembly of the present invention. These and other objects, features and advantages of the present invention will become apparent from the drawings, detailed description and claims which follow.

BRIEF DESCRIPTION OF THE DRAWINGS

FIG. 1 is a perspective view of a tubular coupling assembly of the present invention.

FIG. 2 is an exploded view of the coupling assembly of FIG. 1.

FIG. 3 is a cross-sectional view of the coupling of FIG. 1.

DETAILED DESCRIPTION OF THE PREFERRED EMBODIMENTS

Figure 4:
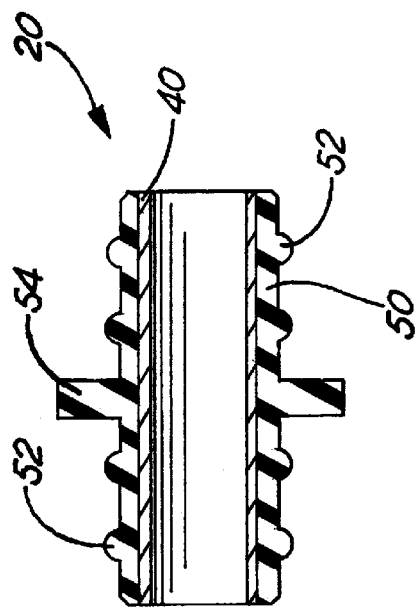
FIG. 4 is a cross-sectional view of the internal sleeve member of the coupling of the present invention.

Referring now to the drawings, FIGS. 1–3 show a tubular coupling assembly 10 structured in accord with the present invention. The coupling assembly 10 includes a pair of identical female coupling members 12, 14 which engage each other and are held together by a single splined stud member 16. To insure against leakage of the coupling, a sealing sleeve 20 is inserted into a volume 22 defined by each of the coupling members 12, 14.

Each of the coupling members 12, 14 is secured to a generally tubular portion 24. This may be done in many ways, such as by mechanically fastening the coupling members to the tubular portions 24. This is done by inserting a tubular member 24 through a coupling member 12 and mechanically expanding the tubular portion to fit tightly against the interior surface of the coupling member 12. The member 12 may include splines disposed on its interior surface, against which the tubular portion is expanded for a better hold. Other fastening means may be utilized as well, such as by brazing. Alternatively, the coupling members can be fabricated with the tubular portions as a unitary member. Each tubular portion 24 includes an expanded portion 26 and a transition portion 28 disposed between the tubular portion 24 and the expanded portion 26. The expanded portion 26 fits through an aperture 29 in the coupling member 12 in an interference fit as explained above includes a flange 30 circumferentially disposed at one end thereof for receiving a sealing member into it. The flanges 30 are received in annular recesses 31 formed in generally planar engaging surfaces 33 of the coupling members 12, 14. A block member 32 formed on each of the coupling members 12, 14 extends radially from the expanded portion 26. Each of the block members 32 includes an aperture 34 extending all the way through for receiving the splined stud member 16 therethrough.

Each of these female coupling members 12, 14, is manufactured from an aluminum alloy in a multiple step stamping operation. The coupling members can be fabricated from materials other than aluminum as well.

As shown in FIG. 4, the sealing sleeve 20 is a generally cylindrical, elongated member 40 disposed in the volume 22 formed between the engaged female coupling members 12, 14. The sealing sleeve member 20 includes a plurality of box like grooves 42 circumferentially disposed therearound. A plurality of sealing members, such as O-rings 44 as disposed at each one of these box like grooves 42. A center box like groove 46 is formed in the sealing sleeve member 20 and receives an axial center seal 48 disposed in that groove. The axial center seal 48 extends radially further away from an outer surface of the sleeve member than do the O-rings 44 and sits into the flange portion 30 of each of the female coupling members 12, 14 when the coupling members are secured together. The O-rings 44 engage the interior surface of the expanded portions 26 of the female coupling members when the coupling members are secured together and thus prevent leakage of the fluid from the coupling assembly. The sleeve member can also be fabricated without the axial center seal 48.

Figure 5:
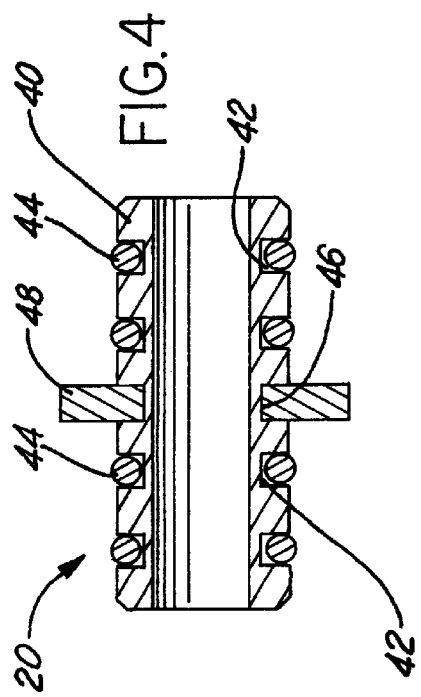
FIG. 5 is a cross-sectional of an alternative embodiment of the sleeve member of the present invention.

FIG. 5 shows an alternative embodiment of the sleeve member 20 wherein the general cylindrical member 40 has been coated with an elastomeric coating 50, such as a rubber compound. As can be seen in FIG. 5, raised projections 52 extending axially away from the outer surface of the sleeve member 20 are formed integrally with the rubber or elastomeric coating 50 surrounding the sleeve member. Furthermore an axially center seal 54 is likewise formed, but as before, this is optional. In this manner, fabrication of the sleeve member is somewhat less complex since box like grooves do not need to be formed within the outer surface of the sleeve.

To secure the two identical female coupling members 12, 14 together, the splined stud 16 is press fit into either one of the apertures in the stud receiving blocks 32. It is an advantage that the spline stud 16 can be press fit through either of the identical female members thus increasing the efficiency of the coupling in the event that packaging prevents access to one of the apertures. One end of the spline stud is threaded and receives a threaded nut 17 thereon for insuring that the two female coupling members are secured tightly together.

Figure 6:
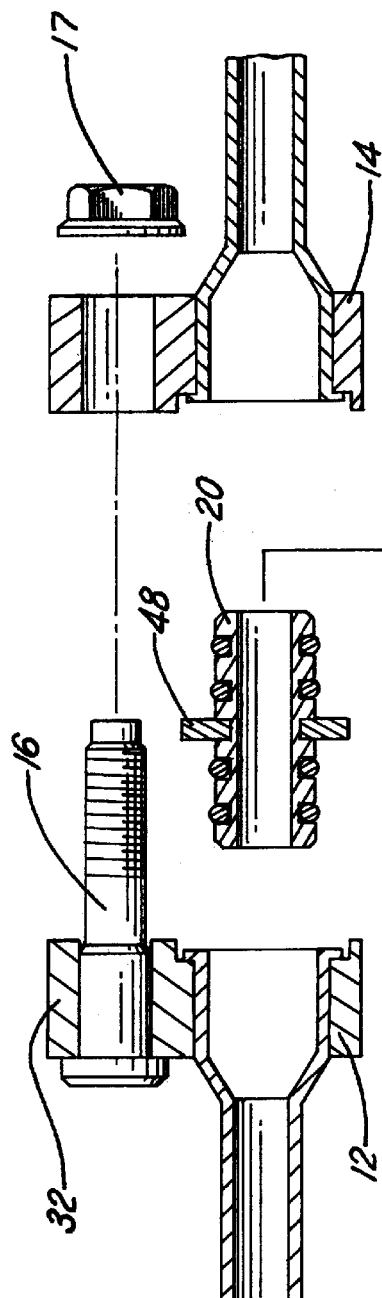
FIG. 6 is an exploded view of an alternative embodiment of the present invention.

FIG. 6 shows an alternative embodiment of the coupling assembly of the present invention further including and orifice tube-type valve 60 disposed within the volume formed by the connection of the two identical female coupling members. The valve 60 is shown in one orientation in FIG. 6, but this orientation could be reversed as well. The orifice valve 60 may be disposed within the sealing sleeve member 20 or may simply include a plurality of O-rings with an axial center seal and serve as a sealing member in addition to being an orifice valve. Obviously, this type of system would be placed on the high pressure side of an air conditioning system employing an orifice valve configuration.

It should be apparent to those skilled in the art that other combinations of the present invention are possible. It is the following claims, including all equivalents, which define the scope of the present invention.

What is claimed is:

1. A tubular coupling assembly, comprising:
   a pair of coupling members having matingly engagable surfaces, each said coupling member having a tubular portion connected to a hollow expanded portion by a hollow transition portion, said expanded portion terminating at said engagable surface and being encircled by an annular recess formed in said engagable surface such that when said engagable surfaces are in contact with each other, and a volume being defined by said expanded portions having a larger diameter than a diameter of said tubular portions;
   a generally cylindrical, elongate sleeve member disposed within said volume, said sleeve member having an outer surface with a plurality of circumferential sealing members radially extending therefrom into sealing contact with interior surfaces of said expanded portions, said sleeve member including a circumferential center seal radially extending into sealing contact with said annular recesses, said center seal having a radial diameter greater than a radial diameter of each of said sealing members; and
   a stud, each said coupling member having a stud receiving block member extending radially from said expanded portion with an aperture formed therethrough, said stud being fixed by a press fit into one of said apertures in said stud receiving blocks and extending through another of said apertures in said stud receiving blocks to secure said coupling members together with said engagable surfaces in contact.

2. The tubular coupling assembly according to claim 1 wherein said sleeve member is fabricated from a metal material and includes a plurality of grooves circumferentially disposed therearound for receiving said sealing members therein.

3. The tubular coupling assembly according to claim 2 wherein said sealing members are O-rings.

4. The tubular coupling assembly according to claim 1 wherein said sleeve member includes a pair of said sealing members disposed on each side of said center seal.

5. The tubular coupling assembly according to claim 1 wherein said sleeve member includes a rigid, generally elongate, cylindrical member having an exterior surface and an elastomeric coating bonded to said exterior surface forming said outer surface of said sleeve member.

6. The tubular coupling assembly according to claim 5 wherein said center seal and said sealing members are a plurality of radially extending circumferential projections of said elastomeric coating.

7. The tubular coupling assembly according to claim 1 including an orifice valve disposed within said sleeve member.

8. The tubular coupling assembly according to claim 1 wherein said sleeve member includes an orifice valve.

9. The tubular coupling assembly according to claim 1 wherein said stud includes a plurality of splines engaging an interior surface of said one of said apertures in said stud receiving blocks.

10. A tubular coupling assembly, comprising:
    a pair of coupling members having matingly engagable surfaces, each said coupling member having an aperture formed therethrough with an interior surface and terminating at said engagable surface;
    a pair of tubular portions each terminating in a hollow expanded portion connected to said tubular portion by a hollow transition portion, each said expanded portion secured in an associated one of said coupling member apertures such that when said engagable surfaces are in contact with each other, and a volume being defined by said expanded portions having a larger diameter than a diameter of said tubular portions;
    a generally cylindrical, elongate sleeve member disposed within said volume, said sleeve member having an outer surface with a plurality of circumferential sealing members radially extending therefrom into sealing contact with interior surfaces of said expanded portions, said sleeve member having a radially extending center seal with a radial diameter greater than a radial diameter of each of said sealing members; and
    a stud, each said coupling member having a radially extending stud receiving block member with an aperture formed therethrough, said stud being fixed in one of said apertures in said stud receiving blocks and extending through another of said apertures in said stud receiving blocks to secure said coupling members together with said engagable surfaces in contact.

11. The tubular coupling assembly according to claim 9 wherein said engagable surfaces each have an annular recess formed therein encircling said termination of said aperture, each said expanded portion has a flange formed at one end thereof, and said annular recesses receive said flanges and said axial center seal therein.

12. The tubular coupling assembly, comprising:

a pair of coupling members having matingly engagable surfaces, each said coupling member having an aperture formed therethrough with an interior surface, each said engagable surface having an annular recess formed therein encircling said termination of said aperture;

a pair of tubular portions each terminating in a hollow expanded portion connected to said tubular portion by a hollow transition portion, each said expanded portion secured in an associated one of said coupling member apertures having a flange formed at one end thereof received in said recess such that when said engagable surfaces are in contact with each other, and a volume being defined by said expanded portions having a larger diameter than a diameter of said tubular portions;

a generally cylindrical, elongate sleeve member disposed within said volume, said sleeve member having an outer surface with a plurality of circumferential sealing members radially extending therefrom into sealing contact with interior surfaces of said expanded portions, said sleeve member having a radially extending center seal with a radial diameter greater than a radial diameter of each of said sealing members; and a stud, each said coupling member having a radially extending stud receiving block member with an aperture formed therethrough, said stud being fixed in one of said apertures in said stud receiving blocks and extending through another of said apertures in said stud receiving blocks to secure said coupling members together with said engagable surfaces in contact.

13. The tubular coupling assembly according to claim 12 wherein said radially extending circumferential center seal is received in said annular recesses.

\* \* \* \* \*